US006968198B2

(12) United States Patent
Nylund

(10) Patent No.: US 6,968,198 B2
(45) Date of Patent: Nov. 22, 2005

(54) DATA PASSING METHOD AND APPARATUS FOR WIRELESS COMMUNICATION SYSTEM

(75) Inventor: Blake James Nylund, Lynchburg, VA (US)

(73) Assignee: M/A-COM, Inc., Lowell, MA (US)

( * ) Notice: Subject to any disclaimer, the term of this patent is extended or adjusted under 35 U.S.C. 154(b) by 337 days.

(21) Appl. No.: 10/075,512

(22) Filed: Feb. 15, 2002

(65) Prior Publication Data

US 2003/0157948 A1    Aug. 21, 2003

(51) Int. Cl.[7] ............................................. H04B 15/00
(52) U.S. Cl. ..................... 455/502; 455/500; 455/16; 370/315; 370/331
(58) Field of Search .................... 455/7, 41.2, 11.1, 455/15, 16, 502, 406, 403, 500; 707/203; 709/208; 395/617; 370/315, 331

(56) References Cited

U.S. PATENT DOCUMENTS

| | | | |
|---|---|---|---|
| 5,630,116 A | 5/1997 | Takaya et al. | 395/617 |
| 5,898,679 A * | 4/1999 | Brederveld et al. | 370/315 |
| 6,178,443 B1 | 1/2001 | Lin | 709/208 |
| 6,317,754 B1 | 11/2001 | Peng | 707/203 |
| 2002/0183038 A1 * | 12/2002 | Comstock et al. | 455/406 |
| 2003/0036374 A1 * | 2/2003 | English et al. | 455/403 |
| 2003/0156558 A1 * | 8/2003 | Cromer et al. | 370/331 |
| 2004/0223469 A1 * | 11/2004 | Bahl et al. | 370/331 |

\* cited by examiner

Primary Examiner—Lester G. Kincaid
Assistant Examiner—Phuoc Doan

(57) ABSTRACT

The invention is a method and apparatus in which data can be transferred between a mobile node and a fixed based node in a wireless local area network through a data passing scheme in which data can be bounced between a base node and an out-of-range mobile node through other mobile nodes.

19 Claims, 2 Drawing Sheets

DATA PASSING METHOD AND APPARATUS FOR WIRELESS COMMUNICATION SYSTEM

FIELD OF THE INVENTION

The invention pertains to communication systems, such as wireless local area networks and land mobile radio (LMR) systems, for wireless communication between a plurality of mobile nodes as well as between one or more geographically fixed nodes and the mobile nodes. More particularly, the invention pertains to a method and apparatus for distributing data to a plurality of mobile nodes utilizing a combination of communication with fixed access points and a peer-to-peer data passing scheme.

BACKGROUND OF THE INVENTION

Civilian public safety organizations, such as municipal police squads, municipal fire departments, private security organizations, and other public service organizations, commonly utilize two-way radio communication systems that allow mobile nodes, such as police squad cars, fire trucks, individual patrollers with two-way radios, etc., to communicate with each other as well as with one or more geographically fixed nodes, such as a headquarters or precinct building. Such systems are, in essence, wireless local area networks (WLANs). Such systems are commonly used to carry voice communications, often using encrypted digital channels, as well as other data. For instance, squad cars often have PCs, laptop computers or other computing devices that can connect to the WLAN to download various forms of data, such as motor vehicle records for a particular driver or license plate, arrest records for particular individuals, bulletins from headquarters, photographs (such as mug shots), etc, from one or more central servers coupled to the WLAN (typically through a wired LAN). Often, the mobile nodes, such as squad cars maintain local copies of certain types of data, such as mug shots and bulletins.

In addition, the mobile nodes may, not only receive data from a central server, but send data to the central server. For instance, police officers may prepare and transmit arrest reports and other reports to the central server using the WLAN so that coworkers working in a precinct building can have more immediate access to such reports, rather than waiting for officers to physically return to the precinct before such reports can be entered (in a database maintained on the central server). This may also make record keeping more efficient since an officer can directly create an electronic version of the record, rather than preparing a hard copy of the report, which would then need to be entered into the database in a separate manual step when the officer returned to the precinct.

These types of WLANs typically cover a specific geographic area, such as a municipality or county. The area that such a network must cover often is larger than can be covered by a single fixed antenna because the power with which two way radios and related fixed antennas can transmit data is limited, not only by practical weight and power considerations (especially for the mobile nodes), but also by local state or national regulation. Accordingly, a plurality of antenna nodes positioned at geographically separate locations in the municipality might commonly be coupled to a wired LAN, each antenna having full-time haul back capabilities to the central server(s) via the wired LAN. Of course, the wired LAN (which may also be considered the wired portion of an overall LAN that also includes the wireless LAN) also typically would include other fixed nodes in addition to the antenna nodes, such as dispatchers and desktop computers that also communicate with the central server(s) and/or the mobile nodes. When a mobile node is within range of a fixed access point it communicates directly with the host (or central server) via the fixed access point. However, when a mobile node moves beyond transmission range of a fixed access point, it essentially cannot communicate with the WLAN until it returns within range of one of the fixed access points. Thus, if a central server has data to be transmitted to a particular mobile node or vice versa and that mobile node is out of radio transmission range of any fixed access point, that mobile node simply was unable to receive the data until the mobile node came back into radio range.

These types of WLANs commonly also incorporate a protocol by which two mobile nodes can directly communicate with each other on a peer-to-peer basis if they are within range of each other.

The cost of installing the infrastructure to support multiple remote fixed access points (e.g., antennas) for such WLANs can be substantial and includes costs such as leases on the lines necessary to connect the remote fixed access points to the wired portion of the LAN.

It often is economically infeasible to provide enough fixed access points (i.e., antennas) to fully cover an municipality. Accordingly, mobile nodes, e.g., squad cars, may be out of communication with headquarters and/or other mobile nodes for lengthy periods of time and, hence, be unable to receive potentially important data and updates.

Accordingly, it is an object of the present invention to provide an improved wireless communication system.

It is another object of the present invention to provide a WLAN that enables data to be indirectly transmitted between a mobile node and a server even when the mobile node is out of range of any fixed access point.

It is a further object of the present invention to provide a wireless communication system in which data can be transferred between a mobile node and a fixed access point through other mobile nodes.

SUMMARY OF THE INVENTION

The invention is a wireless communication method and apparatus by which, when a first mobile wireless node of a communication network is out of radio transmission range of any fixed antenna node, data that is to be transferred between that mobile node and the fixed antenna node is first transferred from the transmitting node (either the first mobile node or the fixed antenna node depending on the direction of data flow) to one or more second mobile nodes that are within radio range of the transmitting node and subsequently transferred from one of the second mobile nodes to the first mobile node if and when the first and second mobile nodes come within radio transmission range of each other.

While the protocol for assuring that appropriate data is passed at appropriate times to the mobile nodes and vice versa can take countless forms, one preferred scheme utilizes a software agent in each mobile node that maintains a list of files, directories or other forms of data that need to be synchronized with a central server periodically. The agent periodically checks to determine if those files, directories, etc. are up-to-date by querying the central server through a fixed access point for newer versions of those files, etc. If the mobile node establishes a link with the central server through a fixed access point (i.e., an antenna node), the mobile node compares its versions of the selected files, directories, etc. with the corresponding data maintained in the central server and downloads data corresponding to any updates from the central server in order to update its records. If the agent cannot establish communication with the central server through a fixed access point, it then searches for other peer mobile nodes within radio range. If a peer mobile node (or fixed access point) is discovered, the first mobile node compares its versions of the selected files, directories, etc. with those maintained in the peer with which it is communicating. If its version of any of those files, directories, etc. is older than the corresponding versions in the other peer (or the fixed access point), it downloads from the peer the necessary data for updating its own records and updates its corresponding outdated files, etc. accordingly. Preferably, the synchronization comprises full bidirectional synchronization. Specifically, it is possible that the mobile node that requested an update from another mobile node actually has more recent data than the responding mobile node. In such a case, the updating data should be sent from the requesting node to the responding node even though the responding node did not initiate the synchronization sequence.

The data passing also can occur in the opposite direction from mobile nodes to fixed access points. For example, a fixed access point can be provided in a remote area of a coverage zone in a locale that mobile nodes are expected to frequently visit. The access point can be set up inexpensively without providing direct, wired back haul to the central server, which can be extremely expensive. Rather, the fixed access point updates its files, etc. by running the same software agent as the mobile nodes thereby querying mobile nodes that come within radio range of it for updated data. The remote fixed access point can then turn around and provide that data to other mobile nodes that issue requests for updates within radio transmission range of the remote fixed access point.

DETAILED DESCRIPTION OF THE INVENTION

Figure 1:
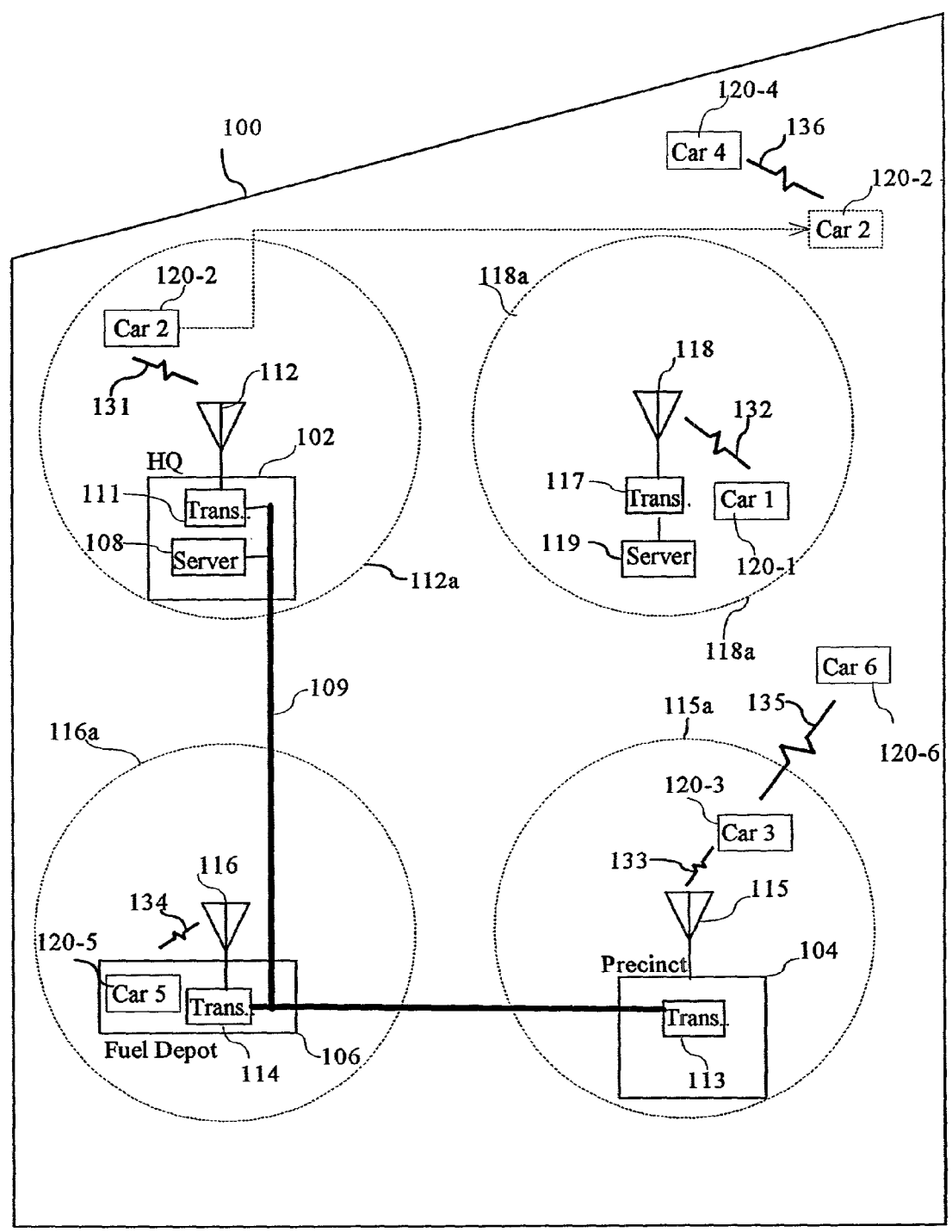
FIG. 1 is a diagram illustrating an exemplary municipality in which a WLAN in accordance with the present invention is operating.

FIG. 1 is an overhead view of an exemplary geographic zone that is to be covered by a WLAN in accordance with the present invention. For sake of example, the discussion and descriptions below of specific embodiments of the invention will be set forth in connection with an exemplary police force using the WLAN for radio communication between multiple fixed nodes, such as a police headquarters, precincts and fueling depots, and a plurality of mobile nodes, e.g., squad cars. The wireless communication between the mobile nodes and the fixed nodes typically would be carried over encrypted digital channels in accordance with any reasonable LMR system. One standard for LMR is 802.11b DSSS WLAN established by the IEEE. However, the present invention can be employed in connection with any type of wireless LAN regardless of whether the communication channels are encrypted or not, whether the communication channels are digital or not or any particular communication protocol or standard.

Referring now to FIG. 1, the geographic zone 100 to be covered by the WLAN comprises a municipality in which the police department has a headquarters 102, a secondary precinct 104 at a geographically remote location from the headquarters 102 and a fueling depot 106 where squad cars can refuel. In this example, a data server 108 physically located at the headquarters 102 is coupled to a wired local area network 109. The headquarters also has a transceiver 111 including an antenna 112 for communicating with mobile nodes, such as squad cars 120 via a wireless LAN. The police department also maintains at least two other transceivers 113, 114 that form nodes of the wired LAN and associated antennas 115, 116 that can transmit data to and receive data from mobile nodes (and, accordingly, also are nodes of the wireless LAN). Each antenna 112, 115, 116 has a transmission coverage area 112a, 115a, 116a, respectively, that can cover only a portion of the total geographic zone 100. In this example, none of the transmission coverage areas of the three antennas overlap. In other embodiments, they could overlap somewhat. In this particular example, antenna 115 is positioned at the remote precinct house 104 and antenna 116 is located at the fuel depot 106.

Finally, there is a fourth transceiver 117 and antenna 118 preferentially located in a location that the squad cars are expected to pass near on a regular basis. Antenna node 118 has a remote server 119 associated therewith that is intended to store data redundant of the data on central server 108. However, antenna 118, transceiver 117, and server 119 are not coupled to the wired LAN 109. The manner in which the data in server 118 is kept current is discussed in detail below and forms a significant aspect of one embodiment of the present invention. Blocks 120-1, 120-2, 120-3, 120-4, 120-5, and 120-6 represent squad cars in various locations throughout zone 100.

In addition to supporting real time, two-way voice communication between police officers in the field (e.g., in squad cars 120) and police personnel at headquarters 102 and the secondary precinct 104, the WLAN also provides digital data communication between various mobile and fixed computing devices such as computers, servers and portable laptop computers in the squad cars, precint, and elsewhere. These various computing devices might store particular data files such as mug shots, lists of stolen vehicles, and other records. Such records may be centrally stored on the server 108 and updated therein on a regular basis. The mobile nodes (e.g., the computers in the squad cars) often also maintain local copies of such data. It is desirable to maintain the copies of those records in the mobile nodes as consistently as possible with the latest data in the central server 108. Updates may include both modifications to previously existing files or other forms of data as well as the addition of new data, such as the addition of new files (e.g., mug shots) to a particular directory.

One common scheme for maintaining synchronization of the data files in the mobile nodes with the main server 108 is for the mobile nodes to maintain a list of files and/or directories that need to be synchronized to the files in the main server 108. The mobile nodes periodically issue a request over the WLAN to synchronize to the files and/or directories in the central server. If the mobile node 120 is within transmission range of one of the fixed antennas 112, 115, and 116, the transceiver coupled to that antenna acknowledges the request, retrieves the pertinent data from the control server 108 though the wired LAN 109, and transmits the desired data to the requesting mobile node. For instance, squad car 120-2 is within radio transmission range 112a of antenna 112 and therefore can synchronize directly to server 108 through antenna 112, as illustrated at 131. Likewise, squad car 120-5 is within radio transmission range 116a of antenna 116 and therefore can synchronize directly to server 108 through antenna 116, as illustrated at 134. Finally, squad car 120-3 is within radio transmission range 115a of antenna 115 and therefore can synchronize directly to server 108 through antenna 115 as illustrated at 133. However squad cars 120-1, 120-4 and 120-6 are not within the transmission ranges of any of the fixed antennas that are coupled to the wired LAN and, therefore, cannot communicate directly with the central server 108. Squad car 120-1 is within transmission range of fixed antenna 118, but that antenna is not directly coupled to the wired LAN. Antenna 118 and squad car 120-1 will be discussed later in this specification in connection with another feature of the present invention.

The specific protocol by which synchronization is performed can take any number of well known forms and is not a limitation of the present invention. In one exemplary embodiment, each mobile node 120 can maintain a time stamp indicating the last time its relevant files and/or directories were updated, which time stamp is sent to the central server along with the request for synchronization. The central server reads the time stamp and sends to the mobile node copies of any files and/or directories that have been modified since the time indicated in the time stamp. The mobile node then replaces the old file with the corresponding new file or adds any new files.

As can be seen in FIG. 1, there are large portions of zone 100 that are not within the coverage range of any of the fixed antennas 112, 115, and 116. Accordingly, if a squad car 120 is not within one of the coverage range 112a, 115a, 116a at the time its computer requests synchronization with the central server, the synchronization cannot be carried out as described above.

In order to alleviate this problem and provide more consistent and up-to-date data to all mobile nodes, a data passing scheme is provided in accordance with the present invention. In accordance therewith, if a mobile node is not within the coverage range 112a, 115a, 116a of one of the fixed antennas that is directly coupled to the central server through the wired LAN, it still can synchronize with the central server 108 indirectly.

Particularly, in accordance with the invention, a mobile node 120 can synchronize with other mobile nodes within transmission range of it. More particularly, if a first squad car that has not been within a coverage range of one of the fixed antennas for a long period of time comes within transmission range of another squad car that has been within the coverage range of one of the antennas and synchronized with the central server more recently, the first squad car will be able to obtain a current version (or, at least, a more current version then it previously had) of the pertinent files and directories. For instance, consider squad car 120-4 whose assignment is a stake out in a portion of zone 100 that is not covered by the coverage area of any of the wired fixed access points (i.e., antennas) 112, 115, 116. However, squad car 120-2 has a different task that occasionally takes it in close proximity to squad car 120-4 and also frequently passes through the coverage area 112a of at least one of the fixed antennas 112. Accordingly, squad car 120-2 has a current or almost current version of the pertinent files and directories. Thus, for instance, let us assume that, at the designated time for synchronization of squad car 120-4, squad car 120-4 cannot contact one of the fixed antennas and therefore cannot directly update its records, but that, at that time, squad car 120-2 is within transmission range of squad car 120-4.

In accordance with one embodiment of the invention, at the designated time, the computer in squad car 120-4 first issues a request to the central server for synchronization. However, because squad car 120-4 is out of the coverage area of any antenna, it is unable to communicate with the central server. Squad car 120-4 then switches over to a secondary scheme in which it issues a request for synchronization to any other mobile node within its transmission range. Mobile node 120-2 receives the request and responds to mobile node 120-4. Mobile nodes 120-2 and 120-4 thereafter synchronize to each other, as illustrated at 136 in the Figure. Of course, it is possible that the requesting mobile node, e.g., 120-4, may actually have more current information than the responding mobile node, e.g., 120-2. Accordingly, in a preferred embodiment, the protocol allows two nodes that have contacted each other as described above to each synchronize to the most recent version of the files and/or directories regardless of the direction of data flow. This can be accomplished using a time stamp scheme as discussed above in connection with directly synchronizing with the central server.

In most practical embodiments, it is likely that, to the extent that any two mobile nodes are not already synchronized, all of the pertinent files and directories in one of the mobile nodes will be more current than the other. Accordingly, the data for synchronizing will flow in only one direction. However, in other embodiments, it may be possible for some of the pertinent files and directories in one of the mobile nodes to be more up to date than in the other mobile node, while other files and directories in the other node may be more up-to-date than in the first node. In such embodiments, synchronization data can flow in both directions.

Note that a mobile node that responds to the request of another mobile node may actually be within radio transmission range of a fixed antenna at the time it receives a request for synchronization. For instance, let us assume that squad car 120-6 requests synchronization with a mobile node when squad cars 120-6 and 120-3 are located as shown in FIG. 1, in which squad car 120-3 is within range 115a of antenna 115 and also is within range to communicate directly with squad car 120-6, but squad car 120-6 is not within range of any of the antennas. Accordingly, in at least one preferred embodiment of the invention, when a mobile node, such as squad car 120-3, receives a request for synchronization from another mobile node, such as squad car 120-6, it first attempts to synchronize directly with the central server 108 through a fixed access point, e.g., 115, before proceeding with synchronization with the requesting mobile node 120-6, regardless of whether it is the otherwise designated time for squad car 120-3 to do so. In this manner, both the requesting mobile node, e.g., squad car 120-6, and the responding mobile node, e.g., squad car 120-3, receive the most up-to-date data possible.

All of the steps of the various embodiments described above can be performed by any reasonable circuit, such as a digital signal processor, a microcontroller, a finite state machine, a microprocessor, a programmed general purpose computer. Most likely, the steps of the present invention are performed by a software agent running on the general purpose computer that already is in the squad cars for storing and processing the very data that is synchronized in accordance with the present invention.

Figure 2:
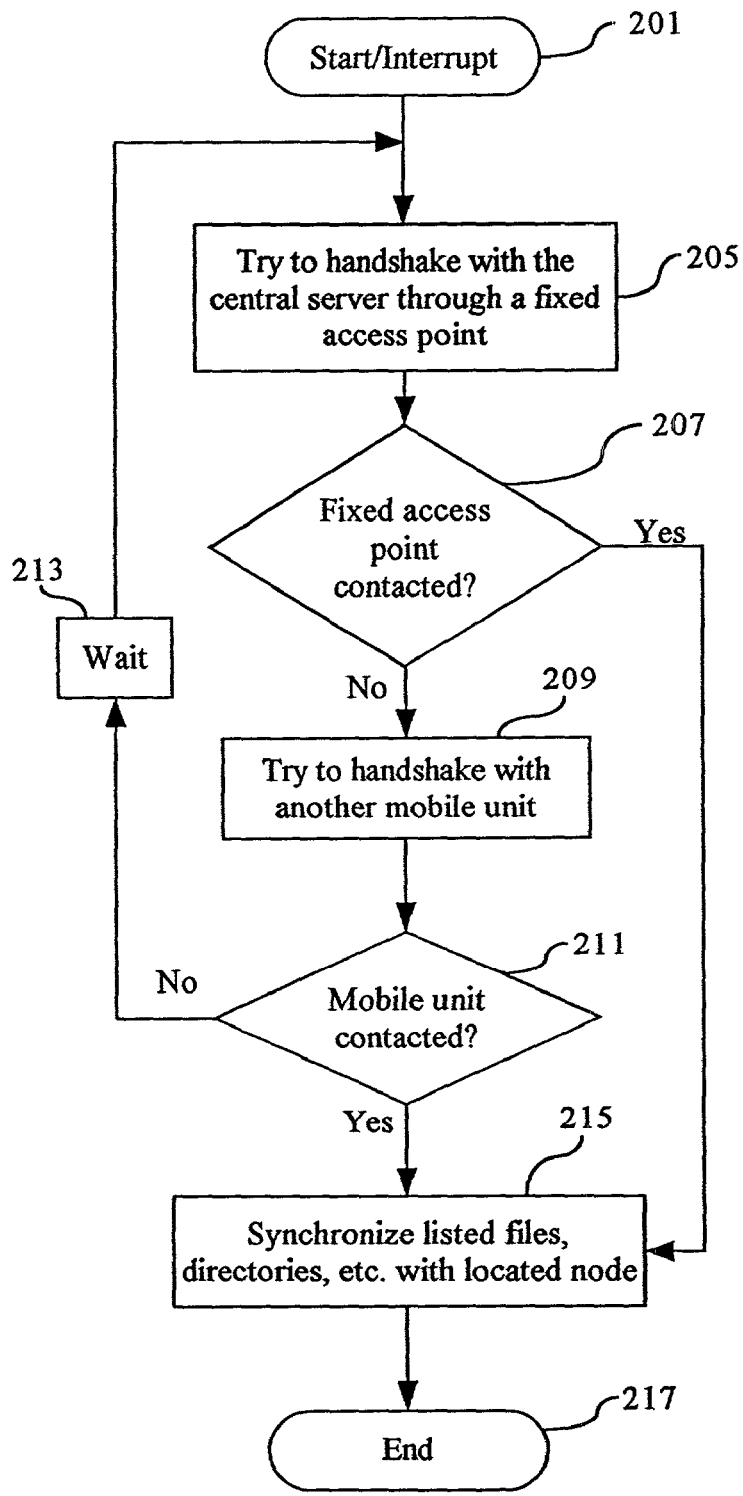
FIG. 2 is a flow diagram illustrating operation of a radio unit in accordance with the present invention.

FIG. 2 is a simple flowchart illustrating processing at a mobile node in accordance with one particular embodiment of the present invention. It should be apparent to persons of skill in the related arts that FIG. 2 represents merely one exemplary synchronization scheme and many others are possible while still practicing the present invention.

The software agent is invoked in step 201, for instance, by an interrupt scheduled to be asserted at a fixed interval after the last synchronization process in accordance with the present invention. Then, in step 205, the mobile node attempts to contact the central server through one of the fixed access points. In decision step 207, if the mobile node makes contact with the central server through a fixed access point, processing jumps to step 215, where the mobile node synchronizes to the central server.

If, on the other hand, contact cannot be established with a fixed access point, processing proceeds to step 209 in which the mobile node attempts to contact another mobile node with which to synchronize. In step 211, if the mobile node makes contact with another mobile node, processing proceeds to step 215, in which the two mobile nodes synchronize to each other. If, on the other hand, the mobile node cannot contact another mobile node. Processing proceeds to step 213 in which the node waits a predetermined amount of time and then returns to step 205 to attempt to synchronize again.

In accordance with a further aspect of the invention, a fixed node that is not directly coupled to the central server 108 through the wired LAN can be updated in exactly the same manner as described above for the mobile nodes. For instance, consider fixed antenna 118. Let us assume that it is undesirable to provide direct back haul from antenna 118 to the central server 108 via wired LAN 121. This could be for several reasons, such as the cost of providing the necessary infrastructure, including leased land lines, to provide back haul. In at least one embodiment of the invention, the fixed antenna node 118 is essentially identical in all operating aspects to the mobile nodes 120 described above, except that it is in a fixed location. This node includes an antenna 118, a transceiver 117 and a data server 119. As mobile nodes, such as squad car 120-1, come within the coverage zone of antenna 118, they can synchronize with the server 119. In some cases, the squad car will have more recent data than the server 119 and, in other cases, the server 119 will have more recent data than the squad car (because it had previously synchronized with another squad car that synchronized with the central server 108 more recently than the present squad car). Accordingly, synchronization can occur in both directions.

Hence, the present invention provides a wireless communication system that utilizes a peer-to-peer data processing scheme as well as a server-client protocol to provide excellent coverage over a large area with a substantially reduced requirement for infrastructure, such as antennas and land lines.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of distributing data in a network comprising a plurality of mobile nodes and at least a first fixed node, wherein at least a portion of the network for communicating with said mobile nodes is wireless, said method comprising the steps of:
    (1) transmitting data via said wireless portion of said network from said fixed node to at least a first of said mobile nodes that is within wireless transmission range of said fixed node;
    (2) transmitting said data from said first mobile node to a second of said mobile nodes responsive to said first mobile node coming within wireless transmission range of said second mobile node; and
    (3) before performing step (2), determining if said second mobile node already has said data;
    wherein step (2) is performed only if said second mobile node does not already have said data.

2. The method of claim 1 wherein step (3) comprises the steps of:
    (3.1) said mobile nodes maintaining a list of file names of files that are to be synchronized with corresponding files of said fixed node;
    (3.2) for each of said file names on said list, comparing said corresponding file of said first mobile node with said corresponding file of said second mobile node to determine if they are synchronized; and
    (3.3) if they are not synchronized, performing step (2);
    wherein, in step (2), the two files are synchronized to a one of said two files that is more recent.

3. The method of claim 2 wherein said files have a time stamp associated therewith and wherein step (3.2) comprises comparing said time stamps of said two files.

4. The method of claim 1 wherein step (1) comprises the steps of:
    (1.1) said first mobile nodes issuing a request to said fixed node for said data;
    (1.2) responsive to receipt of said request from said first mobile node, said fixed node transmitting said data to said at least one mobile node.

5. The method of claim 4 wherein step (1.1) is performed periodically.

6. The method of claim 1 further comprising a second fixed node and wherein said second fixed node cannot communicate directly with said first fixed node, said method further comprising the steps of:
    (5) transmitting data from a mobile node to said second fixed node when said mobile node comes within wireless transmission range of said second fixed node.

7. The method of claim 6 further comprising the step of:
    (6) before performing step (5), determining if said mobile node already has said data;
    wherein step (5) is performed only if said fixed node does not already have said data.

8. The method of claim 7 wherein step (6) comprises the steps of:
    (6.1) said mobile node and said fixed node maintaining a list of file names of files that are to be synchronized with corresponding files of said fixed node;
    (6.2) for each of said file names on said list, comparing said corresponding file of said mobile node with said corresponding file of said fixed node to determine if they are synchronized; and
    (3.3) if they are not synchronized, performing step (2);
    wherein, in step (2), the two files are synchronized to a recent one of said two files that is more.

9. A method of distributing data in a network comprising a plurality of mobile nodes and at least a first fixed node, wherein at least a portion of the network for communicating with said mobile nodes is wireless, said method comprising the steps of:
 (1) said mobile nodes issuing requests via said wireless portion of said network for data from said fixed node;
 (2) responsive to receipt of said requests, said fixed node transmitting said data via said wireless portion of said network to said mobile nodes from which it receives said requests;
 (3) if a mobile node does not receive said data requested in step (1) from said fixed node, said mobile node issuing a request for said data from other mobile nodes; and
 (4) if another mobile node receives said request issued in step (3) and has said requested data, said another mobile node transmitting said requested data to said requesting mobile node.

10. The method of claim 9 further comprising the steps of:
 (5) each said mobile node maintaining a list of data items that are to be synchronized on said nodes of said network.

11. The method of claim 10 wherein:
 step (1) comprises requesting synchronization of said data items with said fixed node:
 step (2) comprises synchronizing said data items in said mobile nodes with said data items of said fixed node;
 step (3) comprises requesting synchronization of said data items with a mobile node: and
 step (4) comprises synchronizing said data items between said requesting mobile node and said another mobile node.

12. The method of claim 11 wherein step (4) comprises:
 (4.1) determining which of said requesting mobile node and said another mobile node has more accurate data corresponding to said data items; and
 (4.2) transmitting data from said requesting mobile node to said another mobile node with respect to those data items for which said requesting mobile node has more accurate data; and
 (4.3) transmitting data from said another mobile node to said requesting mobile node with respect to those data items for which said requesting mobile node has more accurate data.

13. The method of claim 12 wherein step (5) comprises maintaining a list of one or more of file names and directory names requiring synchronization.

14. The method of claim 13 wherein said one or more of said files and directories corresponding to said file names and directory names have a time stamp associated therewith and wherein step (4.1) comprises determining which mobile node has said data items bearing a later time stamp.

15. The method of claim 9 further comprising a second fixed node wherein said second fixed node cannot communicate directly with said first fixed node, said method further comprising the step of:
 (6) transmitting data from a mobile node to said second fixed node when said mobile node comes within wireless transmission range of said second fixed node.

16. A method of distributing data in a network comprising a plurality of mobile nodes and at least a first fixed node, wherein at least a portion of the network for communicating with said mobile nodes is wireless, said method comprising the steps of:
 (1) said mobile nodes maintaining a list of data items that are to be synchronized to said data of first fixed node corresponding to said data items;
 (2) if a mobile node is within wireless transmission range of said first fixed node, synchronizing said data corresponding to said data items at said mobile node with said data corresponding to said data items at said first fixed node;
 (3) if a mobile node is not within wireless transmission range of said first fixed node and is within wireless transmission range of another mobile node, synchronizing said data corresponding to said data categories at said mobile node with said data corresponding to said data items said another mobile node.

17. The method of claim 16 further comprising a second fixed node wherein said second fixed node cannot communicate directly with said first fixed node, said method further comprising the step of:
 (4) if a mobile node is within wireless transmission range of said second fixed node, synchronizing said data corresponding to said data items at said second fixed node with said data corresponding to said data items at said mobile node.

18. A mobile network node for communicating with a server node as well as other mobile network nodes via a wireless portion of a network comprising:
 a memory for storing data;
 a radio for wirelessly communicating via said wireless portion of said network;
 a first circuit for synchronizing data stored in said memory with corresponding data stored in said first server node via said radio;
 a second circuit for synchronizing data stored in said memory with corresponding data stored in another mobile node if said mobile node cannot communicate with said server node, but can communicate with another mobile network node.

19. The client radio of claim 18 wherein a list of data categories to be synchronized is maintained in said memory and said first and second circuits for synchronizing synchronize data corresponding to said categories with data corresponding to said categories at said base node and said another client radio, respectively.

* * * * *